United States Patent [19]
White

[11] Patent Number: 5,016,937
[45] Date of Patent: May 21, 1991

[54] SHIELD FOR A VEHICLE WINDSHIELD

[76] Inventor: Edward B. White, 858 N. Heritage, Mesa, Ariz. 85201

[21] Appl. No.: 506,286

[22] Filed: Apr. 9, 1990

[51] Int. Cl.$^5$ .............................................. B60J 3/02
[52] U.S. Cl. .................................. 296/97.7; 160/370.2
[58] Field of Search ............................. 296/97.7, 97.8; 160/370.2

[56] References Cited

U.S. PATENT DOCUMENTS

| | | | |
|---|---|---|---|
| 4,790,591 | 12/1988 | Miller | 296/97.7 |
| 4,883,304 | 11/1989 | Elliott | 296/97.8 |
| 4,932,711 | 6/1990 | Goebel | 296/97.7 |

Primary Examiner—Robert R. Song
Attorney, Agent, or Firm—LaValle D. Ptak

[57] ABSTRACT

A shield for inhibiting light and heat transfer through the windshield of a vehicle comprises a sheet of substantially rectangular, flexible opaque material. A first stiff, but flexible, elongated rod is attached to the bottom of the sheet of material. This rod and the sheet of material are releasably secured to the vehicle dashboard or the bottom of the vehicle windshield by a suitable fastener to flex the first rod to substantially conform to the inner curve of the vehicle windshield at the bottom. A second stiff elongated rod is attached to the top of the sheet of material, and a hook is provided to releasably attach the second rod to the mounting post for the rear view mirror of the vehicle or to a separate suction cup placed near the top of the vehicle windshield. When the second rod is so attached, the sheet of material substantially covers the inside of the windshield. When the second rod is unhooked from the hook, it may be placed on the dashboard of the vehicle.

10 Claims, 1 Drawing Sheet

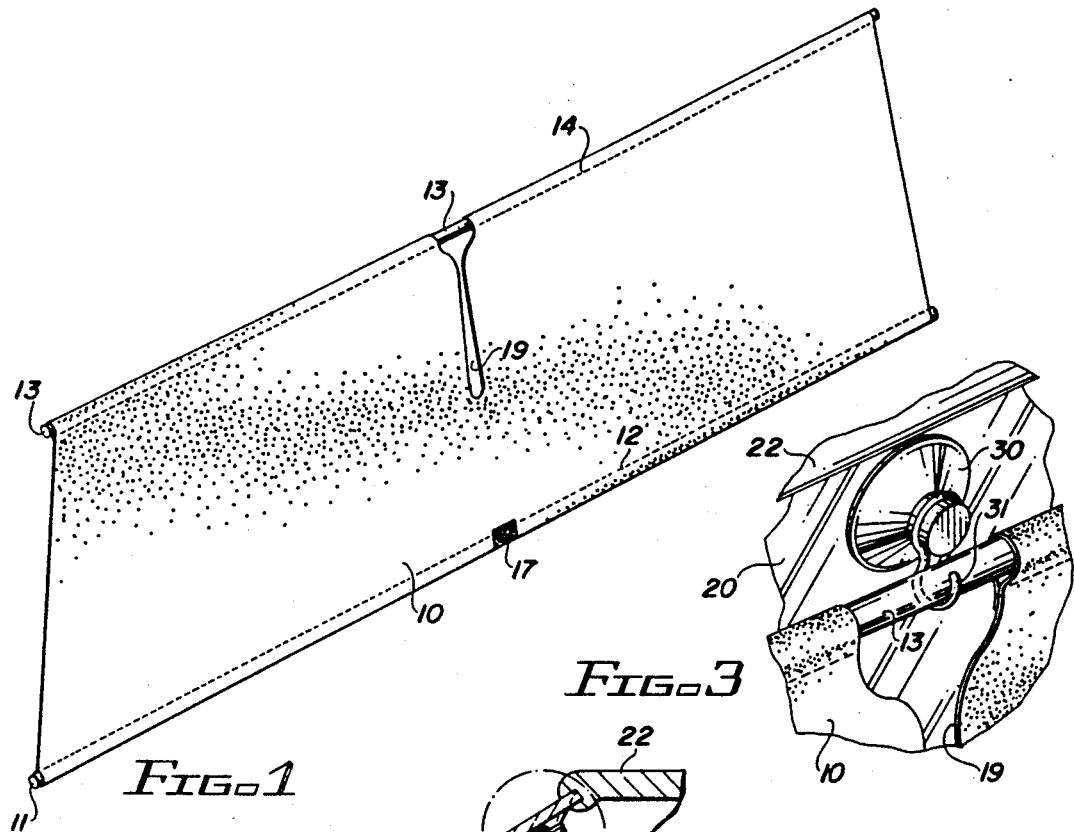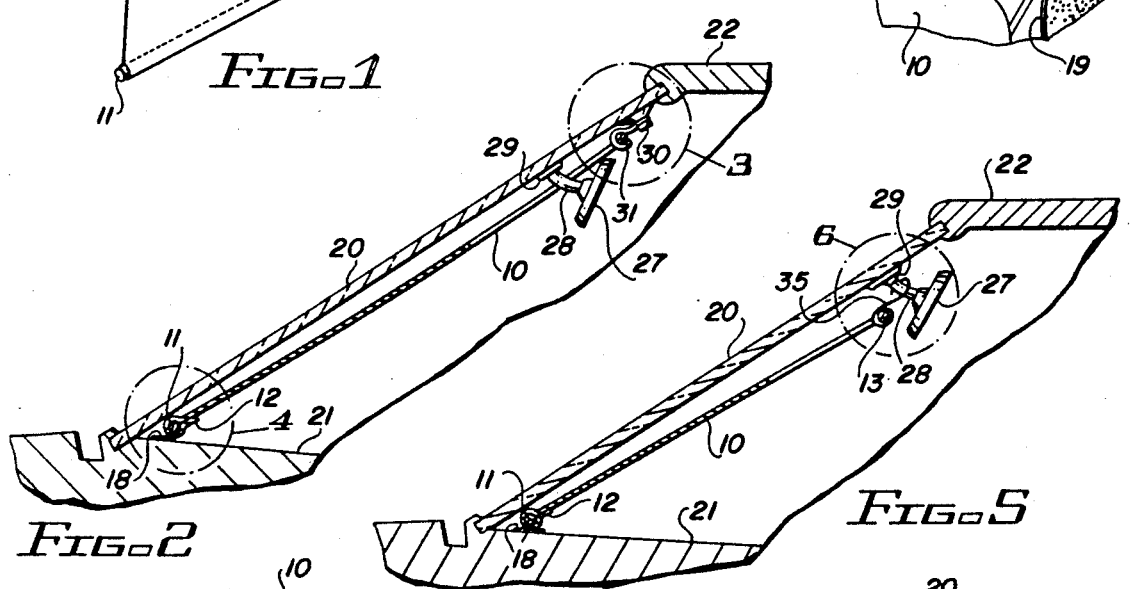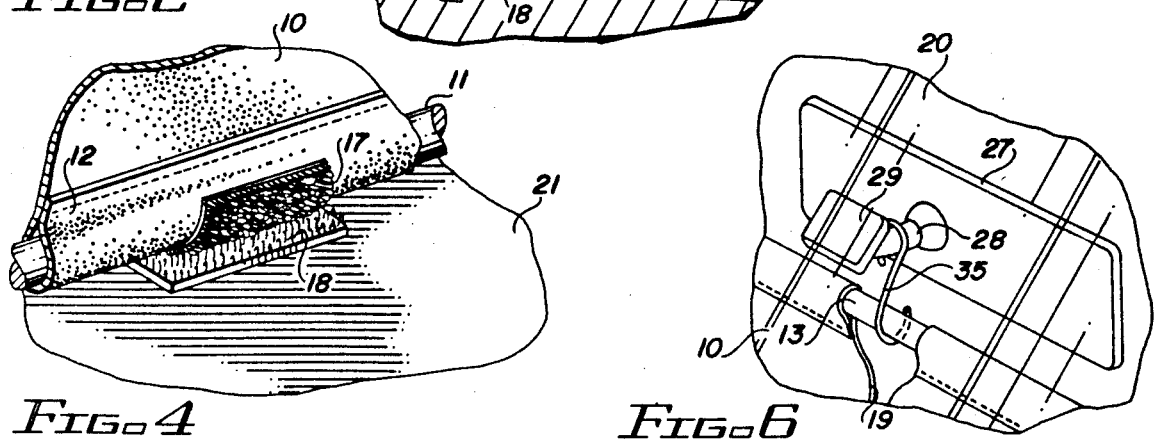

SHIELD FOR A VEHICLE WINDSHIELD

BACKGROUND

In southern areas of the United States and other countries which have intense sunshine, significant heat build-up occurs on the interiors of motor vehicles when such vehicles are parked in the sun. Much of this heat build-up results from the rays of the sun passing through the windshields of such vehicles. This occurs because of the relatively large size of vehicle windshields, and the fact that windshields typically slope backward at a substantial angle. In addition to producing heat build-up in the vehicle interior, the rays of the sun and the heat on the dashboard and upholstery tend to cause damage to these portions of the vehicle interior.

A variety of devices have been developed in the past to shield the interior of the vehicle against entry of the suns rays through the windshield when such a vehicle is parked. A highly popular and relatively simple device is in the form of an accordian-folded cardboard or plastic shield which is unfolded to stretch across the windshield interior To hold such a device in place, the sun visors then are moved to their lowered position to press against the inside of the shield, which, in turn, then is pressed into engagement with the windshield. When operation of the vehicle is desired, the sun visors are raised, and the corregated material is folded up. While these devices are relatively inexpensive, they are cumbersome to handle and wear out relatively quickly.

A variation of a folded corregated sield device is disclosed in the Patent to Klein #4,671,558. The device of this patent is a sheet made of a rollable single-face corregated fiberboard material. The Klein device requires attachment of a roller at one side of the vehicle windshield. When the shield is unrolled, it stretches across the windshield to provide the desired shielding action. As with the accordian-folded cardboard, the device is held in place at the top by lowering the sun visors to press against it.

Other devices have been developed in the form of roller shades, where the roller is attached either to the dashboard at the bottom of the window or at the top. Corresponding mating hooks or other attachment devices are secured on the opposite edge of the windshield. Such a device for the rear window of a hatchback vehicle is disclosed in the Patent to Dieterich #4,261,411. The construction of the shield of Dieterich is nearly identical to the conventional roller shades in common use in houses for many years. A disadvantage of the device of Dieterich is that the roller portion of the shade device must be fastened into the vehicle by means of screws or other attaching devices. Also, it is necessary for the roller to extend in a straight line or it will not operate. This tends to space the central part of the shade away from the window, since practically all motor vehicles currently being produced have rear windows and windshields which are concavely curved (as viewed from the inside).

Another approach which uses flexible fabric as a vehicular windshield curtain is disclosed in the Patent to Sarver #4,560,245. The device of this patent is simply a flexible, rectangular sheet of opaque fabric. Both the top and bottom edges of the fabric are provided with an elongated strip of one portion of a standard fabric hook and loop fastener. Corresponding strips of mating fastener materials are attached either to the dashboard or the bottom edge of the windshield, and also along the top edge of the windshield to fasten the fabric shield in place. The bottom edge normally remains secured. When the device is to be used, the fabric is raised, and the mating attaching material is secured along the top of the windshield to hold the device in place. Because a multiple point or continuous attachment across the entire width of the windshield is employed, installation and removal of the shield requires a person to press the fabric in place from one edge of the windshield to the other. In addition, a relatively unsightly strip of attaching material is clearly visible along the top of the windshield when the device is not in use. For this reason, many automobile owners object to such a device.

It is desirable to provide a shield for inhibiting the passage of heat and light through a vehicle windshield to the interior which overcomes the disadvantages of the prior art mentioned above and which also is effective in operation, easy to install, does not deface the vehicle interior, and is simple to use.

SUMMARY OF THE INVENTION

Accordingly, it is an object of this invention to provide an improved shield for inhibiting light and heat transfer through the windshield of a vehicle.

It is another object of this invention to provide an improved windshield shield which is easy to install and remove.

It is an additional object of this invention to provide an improved fabric shield for inhibiting light and heat transfer through the windshield of a vehicle.

It is a further object of this invention to provide an improved flexible fabric shield for inhibiting light and heat transfer through the windshield of a vehicle which employs a simple releasable attachment at the top thereof for facilitating rapid installation and removal.

In accordance with the preferred embodiment of this invention, a shield for inhibiting light and heat transfer through the windshield of a vehicle comprises a sheet of rectangular flexible opaque material. This material has a first stiff elongated rod attached to the bottom edge. The bottom edge and the first stiff elongated rod are attached to the vehicle near the center of the bottom of a vehicle windshield, and the rod has sufficient flexibility to substantially conform to the curvature of the windshield along the bottom thereof. A second stiff elongated rod is attached to the top of the sheet of material. The center of the second rod is releasably attched to a position near the top of a vehicle windshield. Typically, this attachment is to the mounting post of the rear view mirror of the vehicle.

BRIEF DESCRIPTION OF THE DRAWINGS

FIG. 1 is a perspective view of a preferred embodiment of the invention;

FIG. 2 is a cross-sectional view of the embodiment of FIG. 1, illustrating the manner of installation in an automobile;

FIG. 3 is an enlarged detail of the portion circled as "3" in FIG. 2;

FIG. 4 is an enlarged detail of the portion circled as "4" in FIG. 2;

FIG. 5 is a cross-sectional view similar to FIG. 2 showing an alternative embodiment of the invention; and FIG. 6 is an enlarged detail of the portion circled as "6" in FIG. 5.

DETAILED DESCRIPTION

Reference now should be made to the drawings in which the same reference numbers are used throughout the different figures to designate the same components. FIG. 1 is a perspective view of a preferred embodiment of the invention. FIG. 1 illustrates a shield for inhibiting light and heat transfer through the windshield of a vehicle, such as an automobile or truck. The shield consists primarily of an elongated rectangular sheet flexible opaque material 10. The sheet may be made of a variety of different materials, such as cloth, plastic or the like. To minimize heat transfer throught the windshield of a vehicle when the sheet 10 extends over the interior the sheet typically is made of relatively dark material. It also may be coated with a reflective coating on the side facing the windshield to further improve its efficiency.

As illustrated, the sheet 10 is rolled or turned upwardly along its bottom edge and stitched along a seam 12 to elongated sleeve extending from end to end along the bottom. A rigid plastic or wood dowel rod 11 then is inserted into the sleeve formed by the seam 12, as illustrated most clearly in FIGS. 1 and 4. This attaches the rod 11 to the sheet 10. The top of the sheet 10 also is rolled or turned back on itself and stitched along a seam 14 to provide an elongated sleeve along the top edge. A rigid plastic or wood dowel rod 13 then is inserted into this top sleeve to attach the rod 13 to the sheet 10, as shown most clearly in FIGS. 1 and 3.

Approximately at the center of the top of the fabric sheet 10, the sheet has an elongated vertical slot 19 formed in it. As illustrated, this slot extends a short distance from the top, typically, a distance amounting to ¼ or ⅓ of the total vertical height of the shield when it is in its extended position, as shown in FIG. 1. The slot 19 permits the fabric on either side to be pressed outwardly along the rod 13 toward the ends to allow the rear view mirror 27 of the vehicle to pass through the slot 19 when the sheet is being installed in place. Once the sheet is in place, the fabric is pushed back toward the center to close the slot 19 behind the rear view mirror. This installation is illustrated in FIG. 2.

FIG. 2 is a cross-section of a portion of a typical vehicle, showing the windshield 20 attached between the roof 22 of the vehicle and a dashboard 21. As illustrated most clearly in FIG. 4, one portion of a commonly available hook and loop fastener material 18 is attached to the dashboard 21. A mating piece of complimentary hook and loop fastener material 17 is attached to the center of the lower edge of the material 10, as illustrated in FIGS. 1 and 4. When the device is to be installed in a vehicle, the bottom edge of the sheet 10, with the rod 11 inserted in the sleeve, as illustrated in FIG. 4, is placed along the junction between the lower edge of the windshield and the dashboard 21. At the center of the windshield, the fastener portion 17 then is pressed into engagement with the mating fastener 18 attached to the dashboard 21 to secure the center of the device to the dashboard 21 at the center of the bottom of the windshield 20. The rods 11 and 13 are essentially rigid. At least the rod 11, however, also is sufficiently flexible that it is capable of being bent or configured into the generally concave curvature which occurs along the bottom edges of the windshields of most motor vehicles currently being manufactured today. When the center of the rod 11 is attached, as described, the outer ends of the rod 11 tightly engage the edges of the windshield 20 and cause the bottom of the sheet 10 to curve along the bottom of the windshield 20 where it meets the dashboard 21.

When the device is not in use, the material 10 is simply folded on top of the dashboard 21, and the rod 13 extends across the dashboard in any convenient position. If the sheet 10 is provided with reflective material on the outside, it is desirable to fold the sheet on the dashboard 21 in a manner such that the inside surface of the sheet 10 faces upwardly to prevent unwanted reflections from taking place between the sheet 10 and the interior of the windshield 20.

When blocking of heat and light transfer through the windshield is desired, the user of the device lifts it upwardly by grasping it near the center along the top. The rod 13 the entire sheet 10 to be easily lifted upwardly into position.

Two different techniques for attaching the top of the sheet 10 to a position near the top of the windshield 20 are illustrated. One of these is shown in FIGS. 2 and 3. In the version shown in FIGS. 2 and 3, a suction attaching device 30 is applied to the windshield 20 near the top where it joins with the roof 22 of the vehicle. This suction device 30 has a depending hook 31 on it. The device 30 normally is left in place permanently. The sheet 10 then is lifted upwardly and the center of the rod 13 is placed over the hook 31. This holds the sheet 10 in a postion where the top edge supported by the rod 13 is near the upper edge of the windshield 20. The sheet can either be stretched over the mirror 27 or, as explained previously, the slot 19 may be widened to permit the sheet to be passed over the edges of the mirror 27 and then reclosed to abut opposite sides of the supporting post 28 of the mirror 27. As illustrated in FIG. 2, when the sheet is installed in this manner, the sheet 10 is located behind the mirror 28. It could also, however, pass over the front of the mirror 28. If this later installation is used, the slot 19 is not necessary, and only a small open portion along the rod 13 is needed to faciliate engagement of the rod 13 with the hook 31. Once the sheet 10 is in place covering the interior of the windshield 20, the small gap between the upper edge of the sheet along the rod 13 and the top of the windshield 20 may be covered by lowering the sun visors of the vehicle.

When the vehicle is to be driven, the sheet simply is unhooked from the hook 31 and folded or dropped onto the dashboard 21. It is easy to raise the sheet 10 to the position shown in FIG. 2, and also to lower the sheet 10 back onto the dashboard. Nothing cumbersome needs to be handled, and the rods 11 and 13 significantly simplify the installation and removal of the shield.

FIGS. 5 and 6 illustrate an alternative embodiment where the rod 13 is removably secured to the mounting post 28 of the rear view mirror 27 instead of using a separate suction and hook attachment of the type shown in FIGS. 2 and 3. When the embodiment shown in FIGS. 5 and 6 is employed, a generally "S" shaped hook 35 is employed. One end is placed over the mounting post 28 of the rear view mirror 27 and the other end is used to releasably engage the rod 13. The embodiment shown in FIGS. 5 and 6 functions in the same manner as the one illustrated in FIGS. 2 and 3, and typically is used when the mounting post 28 of the rear view mirror 27 is located high on the windshield of the vehicle, or when the rear view mirror mounting post 28 is attached to the inside front of the roof 22 of the vehicle itself. It is readily apparent, however, that whether the mounting technique shown in FIGS. 2 and 3 is used, or whether the one shown in FIGS. 5 and 6 is used, the shield itself is the same. So far as the shield is concerned, these techniques for mounting it are identical.

It should be understood that it is possible to use other types of releasable mounting mechanisms to secure and release the upper edge of the sheet 10, if desired. The simple hooks, however, which are illustrated in FIGS. 2, 3, 5, and 6, are effective and inexpensive and readily accomplish the desired results.

The foregoing description of the preferred embodiments of the invention should be considered as illustrative and not as limiting. Various changes and modifications will occur to those skilled in the art without departing from the true scope of the invention as defined in the appended claims.

I claim:

1. A shield for inhibiting light and heat transfer through the windshield of a vehicle including in combination:
    a sheet of substantially rectangular flexible opaque material having a top, a bottom and first and second sides;
    a first stiff elongated rod attached to the bottom of said sheet of material;
    first attaching means located substantially near the center of the bottom of said sheet of material for securing said sheet and said first rod near the bottom of a vehicle windshield, said first rod being sufficiently flexible to substantially conform to a curve at the bottom of the windshield of a vehicle when the center of the bottom of said sheet of material is secured near the bottom of such vehicle windshield;
    a second stiff elongated rod attached to the top of said sheet of material; and
    second attaching means for releasably attaching at least one of said second rod and the top of said sheet of material near the top of a vehicle windshield.

2. The combination according to claim 1 wherein said first attaching means releasably secures said sheet and said first rod near the bottom of a vehicle windshield.

3. The combination according to claim 1 wherein the bottom of said sheet of material is turned back on itself and stitched together to form an elongated sleeve into which said first stiff elongated rod is inserted to attach such rod to the bottom of said sheet of material 4. The combination according to claim 1 wherein the top of said sheet of material is turned back on itself and stitched together to form a second sleeve into which said second stiff elongated rod is inserted to attach said second rod to the top of said sheet of material.

5. The combination according to claim 1 wherein said second attaching means comprises hook means for engaging said second elongated rod substantially near the center thereof.

6. The combination according to claim 1 wherein said first attaching means comprises mating male and female fastener means, one of which is attached to the bottom of said first sheet of material and the other of which is adapted to be attached near the bottom of the windshield of a vehicle.

7. The combination according to claim 6 wherein said male and female fastener means comprise fabric hook and loop fastener means.

8. The combination according to claim 1 wherein said second attaching means comprises suction cup means adapted to be secured to the windshield of a vehicle near the top thereof, and a depending hook attached to said suction cup means for releasably engaging said second rod near the center thereof.

9. The combination according to claim 1 further including an elongated slot near the center of the top of said sheet of material and extending substantially perpendicular to the top thereof for accommodating the mounting post of a rear view mirror.

10. A shield for inhibiting light and heat transfer through the windshield of a vehicle including in combination:
    a sheet of substantially rectangular flexible opaque material having a top, a bottom and first and second sides;
    a first stiff elongated rod attached to the bottom of said sheet of material;
    first attaching means located substantially near the center of the bottom of said sheet of material for securing said sheet and said first rod near the bottom of a vehicle windshield;
    a second stiff elongated rod attached to the top of said sheet of material; and
    second attaching means in the form of a double-ended hook means, one end of which is releasably attached near the center of said second rod and the other end of which is adapted to be attached to the mounting post of a rear view mirror for releasably attaching said second rod and the top of said sheet of material near the top of a vehicle windshield.

* * * * *